United States Patent
Noguchi et al.

(10) Patent No.: US 9,540,983 B2
(45) Date of Patent: Jan. 10, 2017

(54) CONSTRUCTION MACHINE

(71) Applicant: Hitachi Construction Machinery Co., Ltd., Bunkyo-ku, Tokyo (JP)

(72) Inventors: Shuuhei Noguchi, Higashiomi (JP); Hajime Yoshida, Omihachiman (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/785,056

(22) PCT Filed: Aug. 5, 2014

(86) PCT No.: PCT/JP2014/070614
§ 371 (c)(1),
(2) Date: Oct. 16, 2015

(87) PCT Pub. No.: WO2015/029716
PCT Pub. Date: Mar. 5, 2015

(65) Prior Publication Data
US 2016/0084134 A1 Mar. 24, 2016

(30) Foreign Application Priority Data
Aug. 30, 2013 (JP) .................................. 2013-180284

(51) Int. Cl.
*F01N 3/00* (2006.01)
*F01N 3/10* (2006.01)
(Continued)

(52) U.S. Cl.
CPC ............. *F01N 9/002* (2013.01); *F01N 3/0235* (2013.01); *F01N 3/035* (2013.01); *F01N 3/106* (2013.01);
(Continued)

(58) Field of Classification Search
CPC ........ F01N 3/035; F01N 3/0235; F01N 3/106; F01N 9/002; F01N 2430/085; F01N 2590/08; F01N 2900/1404; F02D 2200/0812; F02D 41/029; F02D 41/1446; F02D 41/405; Y02T 10/44; Y02T 10/47
See application file for complete search history.

(56) References Cited

U.S. PATENT DOCUMENTS 7,181,909 B2 * 2/2007 Sato ...................... F01N 3/0235
60/274
2005/0223701 A1 10/2005 Sato et al.
(Continued)

FOREIGN PATENT DOCUMENTS

JP 2000-161044 A 6/2000
JP 2005-256720 A 9/2005
(Continued)

OTHER PUBLICATIONS

International Search Report (PCT/ISA/210) issued in PCT Application No. PCT/JP2014/070614 dated Nov. 4, 2014 with English-language translation (five (5) pages).
(Continued)

*Primary Examiner* — Thomas Denion
*Assistant Examiner* — Diem Tran
(74) *Attorney, Agent, or Firm* — Crowell & Moring LLP

(57) ABSTRACT

A regeneration device (22) executes regeneration treatment of a filter (21) in an exhaust gas purifying device (18) by burning particulate matter trapped in the filter (21). The regeneration device (22) interrupts the regeneration treatment of the filter (21) when an exhaust gas temperature T detected by an exhaust gas temperature sensor (26) becomes less than an exhaust gas temperature threshold Tt during a period of performing the regeneration treatment of the filter (21). In a case where the regeneration treatment of the filter (21) is interrupted, when the exhaust gas temperature T
(Continued)

becomes equal to or more than the exhaust gas temperature threshold Tt, the regeneration treatment of the filter (21) is restarted.

1 Claim, 8 Drawing Sheets

(51) Int. Cl.

| | |
|---|---|
| *F01N 3/02* | (2006.01) |
| *F01N 9/00* | (2006.01) |
| *F02D 41/02* | (2006.01) |
| *F02D 41/14* | (2006.01) |
| *F02D 41/40* | (2006.01) |
| *F01N 3/023* | (2006.01) |
| *F01N 3/035* | (2006.01) |

(52) U.S. Cl.
CPC ......... *F02D 41/029* (2013.01); *F02D 41/1446* (2013.01); *F02D 41/405* (2013.01); *F01N 2430/085* (2013.01); *F01N 2590/08* (2013.01); *F01N 2900/1404* (2013.01); *F02D 2200/0812* (2013.01); *Y02T 10/44* (2013.01); *Y02T 10/47* (2013.01)

(56) References Cited

U.S. PATENT DOCUMENTS

| | | | |
|---|---|---|---|
| 2006/0168939 | A1 | 8/2006 | Otsubo et al. |
| 2012/0260633 | A1* | 10/2012 | Masuda ................ F01N 3/0235 60/274 |

FOREIGN PATENT DOCUMENTS

| | | |
|---|---|---|
| JP | 2005-299456 A | 10/2005 |
| JP | 2010-65577 A | 3/2010 |
| JP | 2010-156281 A | 7/2010 |
| JP | 2013-231376 A | 11/2013 |

OTHER PUBLICATIONS

Japanese-language Written Opinion (PCT/ISA/237) issued in PCT Application No. PCT/JP2014/070614 dated Nov. 4, 2014 (four (4) pages).

\* cited by examiner

CONSTRUCTION MACHINE

TECHNICAL FIELD

The present invention relates to a construction machine that is provided with an exhaust gas purifying device suitable for removing harmful substances from an exhaust gas in a diesel engine, for example, or the like.

BACKGROUND ART

In general, a construction machine such as a hydraulic excavator or a hydraulic crane is configured by an automotive lower travelling structure, an upper revolving structure mounted on the lower travelling structure to be capable of revolving thereon, and a working mechanism tiltably mounted on a front side of the upper revolving structure. The upper revolving structure mounts an engine on a rear part in a revolving frame for driving a hydraulic pump, and mounts a cab, a fuel tank, an operating oil tank and the like on a front side in the revolving frame.

Here, a diesel engine is generally used as an engine that is a prime mover of a construction machine. There are some cases where harmful substances such as particulate matter (PM), nitrogen oxides (NOx) and the like are contained in an exhaust gas discharged from such a diesel engine. Therefore, the construction machine is provided with an exhaust gas purifying device in an exhaust pipe forming an exhaust gas passage of the engine for purifying an exhaust gas therein.

The exhaust gas purifying device is configured by an oxidation catalyst (for example, diesel oxidation catalyst, referred to as "DOC" for short) for oxidizing and removing nitrogen monoxides (NO), carbon monoxides (CO), hydrocarbon (HC) and the like that are contained in an exhaust gas, and a particulate matter removing filter (for example, diesel particulate filter, referred to as "DPF" for short) that is arranged downstream side of the oxidation catalyst for trapping and removing particulate matter in the exhaust gas (Patent Document 1).

Incidentally, in the particulate matter removing filter, the particulate matter is accumulated therein following the trapping of the particulate matter, which might cause the filter to be clogged. Therefore, it is necessary to remove the particulate matter from the filter in a point where a predetermined amount of the particulate matter is trapped for regenerating the filter. This regeneration treatment of the filter can be performed in such a manner that fuel injection for regeneration treatment called "post injection" is performed to increase a temperature of an exhaust gas for burning the particulate matter that is accumulated in the filter.

On the other hand, in case the regeneration treatment of the filter is executed in a point where the particulate matter is excessively accumulated in the filter (excessive accumulation), the temperature of the exhaust gas rises to be excessively high (a burning temperature of the particulate matter is excessively high), which might possibly cause the filter to be melted and damaged. Therefore, the conventional art is configured such that a trapping amount of the particulate matter trapped in the filter is estimated (calculated) and the regeneration treatment is automatically executed before the estimated trapping amount becomes excessively large, that is, when the estimated trapping amount reaches a predetermined threshold (Patent Document 2).

PRIOR ART DOCUMENTS

Patent Documents

Patent Document 1: Japanese Patent Laid-Open No. 2010-65577 A

Patent Document 2: Japanese Patent Laid-Open No. 2000-161044 A

SUMMARY OF THE INVENTION

Incidentally, in a case where the regeneration treatment of the filter is executed, for example, when the construction machine performs a light-load work or when the construction machine is kept in a low rotational state (low idle state) where a rotational number (rotational speed) of an engine is low (on standby), a temperature of an exhaust gas does not rise sufficiently. Therefore, even if the regeneration treatment continues to be executed, there is a possibility that the particulate matter cannot be sufficiently burned and removed. Accordingly, it is preferable that the regeneration treatment automatically terminates when the temperature of the exhaust gas is low. However, in a case of simply terminating the regeneration treatment, the regeneration treatment terminates in a state where the particulate matter burns slightly. As a result, in a case where the light-load work or the standby in the state of the low rotational state of the engine is kept, the regeneration operation and the regular operation are possibly alternately repeated by short intervals.

This repetition possibly leads to, for example, an increase in fuel consumption quantity with an increase of post injections, excessive accumulation of particulate matter due to insufficient burning of the particulate matter and deterioration of working conditions by the exhaust gas. In addition to this, uncomfortable feelings are possibly given to an operator following a change in engine sounds at the time of switching the regular operation and the regeneration operation. Further, there is a possibility that fuel having adhered to a cylinder inner wall of an engine due to the post injection falls down into an oil pan, the fuel is then mixed with engine oil, leading to dilution of the engine oil (oil dilution).

The present invention is made in view of a problem of the foregoing conventional art, and an object of the present invention is to provide a construction machine that can suppress a regeneration operation and a regular operation from being alternately repeated by short intervals.

(1) A construction machine according to the present invention comprises a vehicle body; an engine that is mounted on the vehicle body and is driven by injection of fuel; an exhaust gas purifying device that is provided in an exhaust side of the engine and includes a filter for trapping particulate matter in an exhaust gas discharged from the engine; and a regeneration device that burns the particulate matter trapped in the filter in the exhaust gas purifying device to execute regeneration treatment of the filter.

In order to solve the above-described problems, a characteristic of a configuration adopted by the present invention is that the regeneration device comprises: a temperature detector that detects a temperature of an exhaust gas discharged from the engine; a PM calculating unit that estimates a trapping amount of the particulate matter trapped in the filter; a regeneration start determining unit that determines to start the regeneration treatment of the filter when the estimated trapping amount estimated by the PM calculating unit is equal to or more than a preset regeneration start value;

a regeneration interruption determining unit that determines to interrupt the regeneration treatment of the filter when the exhaust gas temperature detected by the temperature detector becomes less than a preset given temperature in the middle of executing the regeneration treatment of the filter; and a regeneration restart determining unit that determines to restart the regeneration treatment of the filter when the exhaust gas temperature becomes equal to or more than the preset given temperature in a case where the regeneration treatment of the filter is interrupted based upon the determination of the regeneration interruption determining unit.

With this arrangement, when the exhaust gas temperature detected by the temperature detector becomes less than the preset given temperature in the middle of executing the regeneration treatment of the filter, the regeneration treatment of the filter is interrupted based upon the determination of the regeneration interruption determining unit. Therefore, when the exhaust gas temperature is low and the sufficient burning of the particulate matter is not expected, the regeneration treatment of the filter is interrupted based upon the determination of the regeneration interruption determining unit. As a result, it is possible to suppress an increase in fuel consumption quantity and dilution of the engine oil due to the mixing of the fuel with the engine oil.

On the other hand, when the regeneration treatment of the filter is interrupted based upon the determination of the regeneration interruption determining unit, the next regeneration treatment is started not on a condition that the estimated trapping amount of the particulate matter in the filter is equal to or more than the regeneration start value, but on a condition that the exhaust gas temperature is equal to or more than the given temperature. That is, even in a case where the exhaust gas temperature is lowered and the generation treatment is interrupted, when the exhaust gas temperature is equal to or more than the given temperature after that, the regeneration treatment of the filter is restarted based upon the determination of the regeneration restart determining unit.

Therefore, it is possible to suppress that the regular operation continues to be performed until the estimated trapping amount becomes equal to or more than the preset regeneration start value. In other words, even when the exhaust gas temperature is lowered to interrupt the regeneration treatment, it is possible to accelerate the burning and removal of the particulate matter trapped in the filter by restarting the regeneration treatment based upon the determination of the regeneration restart determining unit.

Thereby, alternate repetition of the regeneration operation and the regular operation by short intervals can be suppressed, thus preventing deterioration of the working conditions, as well as an operator from being subjected to uncomfortable feelings. In addition thereto, it is possible to realize a reduction in fuel consumption quantity (low fuel consumption), suppression of excessive accumulation of particulate matter and suppression of oil dilution to improve the regeneration device, and finally stability and reliability of the construction machine.

(2) According to the present invention, when the estimated trapping amount estimated by the PM calculating unit is defined as a normal terminated value in a case where the regeneration treatment of the filter normally terminates without the interruption, and when the estimated trapping amount estimated by the PM calculating unit is defined as a restart terminated value in a case of terminating the regeneration treatment restarted based upon the determination of the regeneration restart determining unit, the restart terminated value is set between the regeneration start value and the normal terminated value.

With this arrangement, the restart terminated value is set between the regeneration start value and the normal terminated value. In other words, the restart terminated value as a threshold of the estimated trapping amount in a case of terminating the restarted regeneration treatment is set to be larger than the normal terminated value as a threshold of the estimated trapping amount in a case where the regeneration treatment normally terminates without the interruption. Therefore, even in a case where the exhaust gas temperature tends to be difficult in rising due to the continuation of the light-load work or the standby (neglect) in the low rotational state, it is possible to suppress the regeneration treatment restarted based upon the determination of the regeneration restart determining unit from excessively continuing (the regeneration time from being longer).

BRIEF DESCRIPTION OF THE DRAWINGS

FIG. 3 is a circuit configuration diagram showing an engine, an exhaust gas purifying device, a regeneration device, and the like.

MODE FOR CARRYING OUT THE INVENTION

Figure 1:
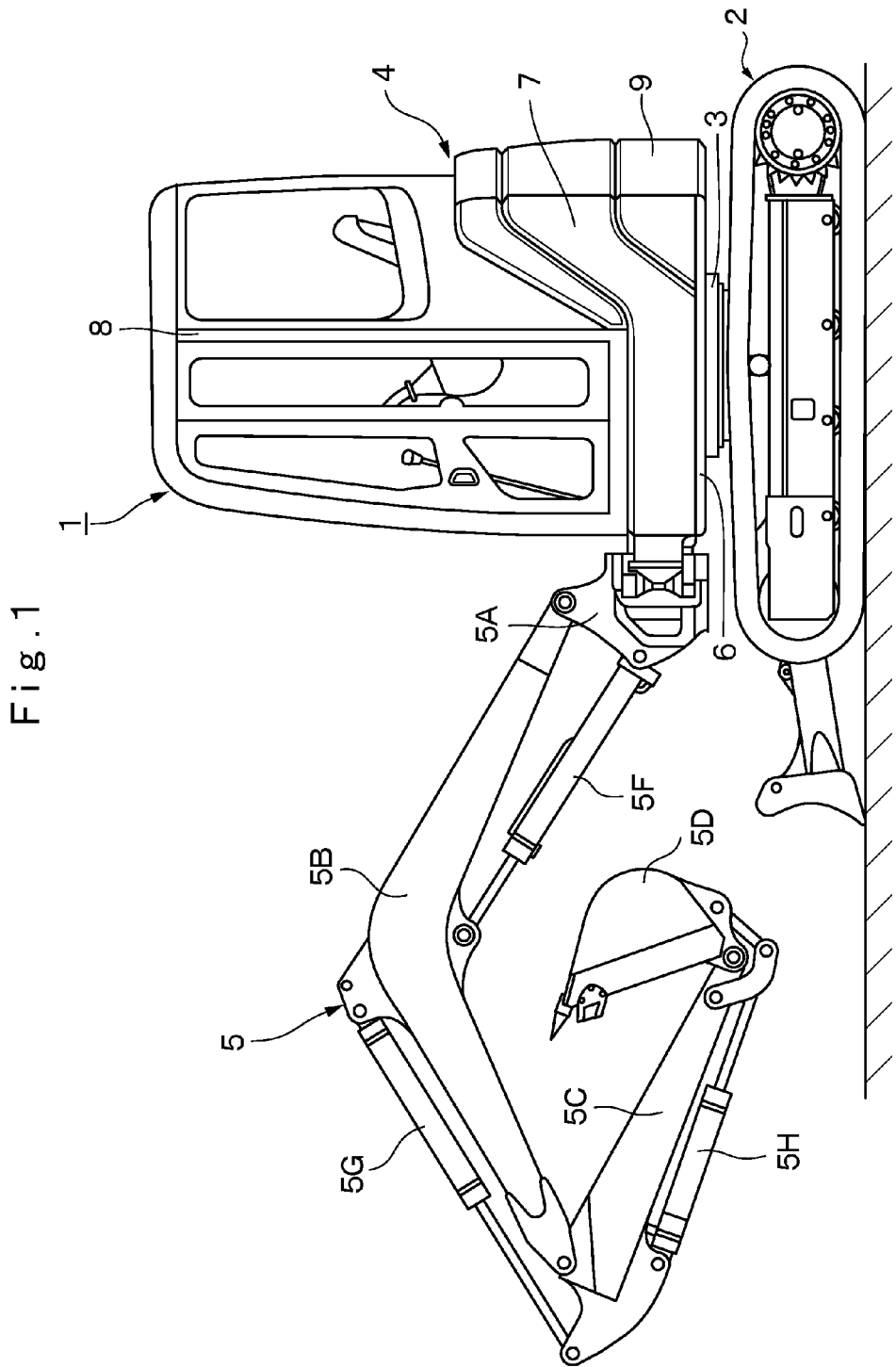
FIG. 1 is a front view showing a hydraulic excavator that is applied to a first embodiment of the present invention.

Hereinafter, embodiments of a construction machine according to the present invention will be in detail explained referring to the accompanying drawings by taking a case where the construction machine is applied to a compact hydraulic excavator called "mini excavator" as an example.

FIG. 1 to FIG. 6 show a first embodiment of the present invention.

In the figure, designated at 1 is a compact hydraulic excavator used for an excavating work of sand and earth or the like. This hydraulic excavator 1 is typically called a mini excavator. The hydraulic excavator 1 includes a crawler type of automotive lower traveling structure 2, an upper revolving structure 4 that is mounted through a revolving device 3 on the lower traveling structure 2 to be capable of revolving thereon and configures a vehicle body together with the lower traveling structure 2, and a working mechanism 5 that is tiltably provided in a front side of the upper revolving structure 4.

Here, the working mechanism 5 is configured as a swing post type working mechanism, and is provided with, for example, a swing post 5A, a boom 5B, an arm 5C, a bucket 5D as a working tool, a swing cylinder 5E (refer to FIG. 2) for swinging the working mechanism 5 in the left-right direction, a boom cylinder 5F, an arm cylinder 5G, and a bucket cylinder 5H. The upper revolving structure 4 includes a revolving frame 6, an exterior cover 7, a cab 8, and a counterweight 9, which will be described later.

The revolving frame 6 forms part of a structure of the upper revolving structure 4. The revolving frame 6 is mounted through the revolving device 3 on the lower traveling structure 2. The revolving frame 6 is provided with the counterweight 9 and the engine 10 in the rear part side, which will be described later, the cab 8 in the left front side which will be described later, and a fuel tank 16 in the right front side which will be described later. The revolving frame 6 is provided with the exterior cover 7 that is positioned from the right side to the rear side of the cab 8. This exterior cover 7 defines therein a space that accommodates the engine 10, a hydraulic pump 15, a heat exchanger 17, an exhaust gas purifying device 18 and the like, together with the revolving frame 6, the cab 8 and the counterweight 9.

The cab 8 is mounted in the left front side of the revolving frame 6, and the cab 8 defines therein an operator's room in which an operator gets. An operator's seat on which the operator is seated, various operational levers and the like (any thereof is not shown) are disposed inside the cab 8.

Figure 2:
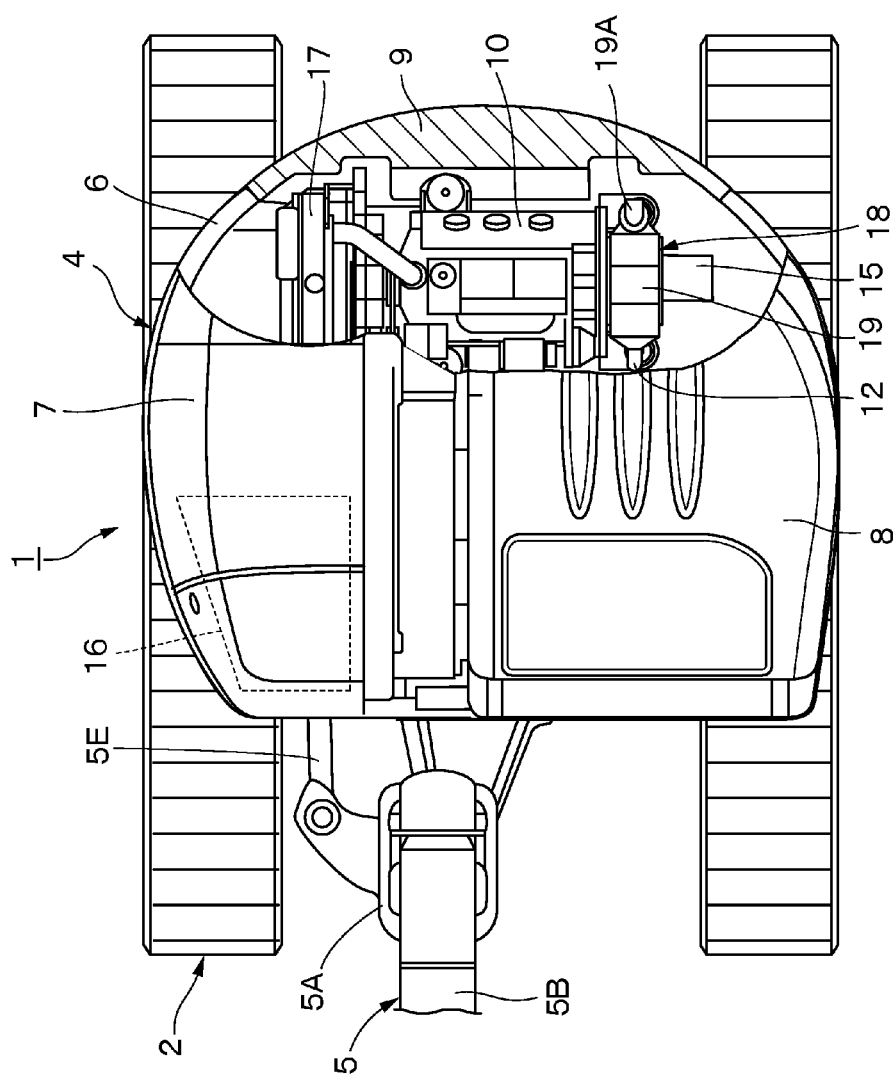
FIG. 2 is a partial cutaway plan view in which the hydraulic excavator is enlarged in a state where a cab and an exterior cover are partially removed from an upper revolving structure in FIG. 1.

The counterweight 9 acts as a weight balance to the working mechanism 5. The counterweight 9 is mounted at the rear end part of the revolving frame 6 to be positioned in the rear side of the engine 10 which will be described later. As shown in FIG. 2, the counterweight 9 is formed in a circular shape on the rear surface side. The counterweight 9 is configured to be accommodated within a vehicle width of the lower traveling structure 2.

Indicated at 10 is the engine mounted in the rear side of the revolving frame 6 in a transversely placed state. The engine 10 is mounted on the compact hydraulic excavator 1 as a prime mover, and is therefore configured by a compact diesel engine, for example. The engine 10 is provided with an intake pipe 11 for taking in outside air (refer to FIG. 3) and an exhaust pipe 12 forming a part of an exhaust gas passage for discharging an exhaust gas. Outside air flows into the intake pipe 11 toward the engine 10, and an air cleaner 13 is connected to the intake pipe 11 in a tip end side for purifying the outside air. The exhaust gas purifying device 18 which will be described later is provided to be connected to the exhaust pipe 12.

Here, the engine 10 is driven by injection of fuel. Specifically, the engine 10 is configured by an electronically controlled engine, and a supply quantity of fuel thereto is variably controlled by a fuel injection device 14 (refer to FIG. 3) including an electronically controlled injection valve. That is, the fuel injection device 14 variably controls an injection quantity of fuel injected into a cylinder (not shown) of the engine 10 based upon a control signal that is output from a controller 27 which will be described later.

Further, the fuel injection device 14 configures part of a regeneration device 22 together with the controller 27 which will be described later and the like (refer to FIG. 3). The fuel injection device 14 performs fuel injection for regeneration treatment, for example, called "post injection" (additional injection after combustion process) in response to a control signal from the controller 27. This post injection increases a temperature of an exhaust gas to burn and remove particulate matter accumulated in a particulate matter removing filter 21 in the exhaust gas purifying device 18 which will be described later.

The hydraulic pump 15 is mounted to the left side of the engine 10. The hydraulic pump 15 forms part of a hydraulic source together with an operating oil tank (not shown). The hydraulic pump 15 is driven by the engine 10 to eject pressurized oil (operating oil) toward a control valve (not shown). The hydraulic pump 15 is configured by, for example, a swash plate type, bent axis type or radial piston type hydraulic pump of a variable displacement type. It should be noted that the hydraulic pump 15 is not necessarily limited to the hydraulic pump of a variable displacement type, but may be configured by using a hydraulic pump of a fixed displacement type.

The fuel tank 16 is provided on the revolving frame 6 to be positioned to the right side of the cab 8, and is covered with the exterior cover 7 together with the unshown operating oil tank and the like. The fuel tank 16 is formed, for example, as a cubic pressure tight tank and reserves therein fuel to be supplied to the engine 10.

The heat exchanger 17 is provided on the revolving frame 6 to be positioned to the right side of the engine 10. The heat exchanger 17 is configured by, for example, a radiator, an oil cooler, and an intercooler. That is, the heat exchanger 17 cools cooling water of the engine 10, as well as pressurized oil that is returned back to the operating oil tank.

Next, the exhaust gas purifying device 18 for purifying an exhaust gas discharged from the engine 10 will be explained.

That is, designated at 18 is the exhaust gas purifying device that is provided in the exhaust side of the engine 10. As shown in FIG. 2, the exhaust gas purifying device 18 is arranged in the upper part left side of the engine 10 in a position above the hydraulic pump 15, for example, and is connected at the upstream side to the exhaust pipe 12 of the engine 10. The exhaust gas purifying device 18 forms part of an exhaust gas passage together with the exhaust pipe 12 and removes harmful substances contained in an exhaust gas during a period where the exhaust gas flows from the upstream side to the downstream side therein.

That is, the engine 10 comprising the diesel engine has a high efficiency and is excellent in durability, but harmful substances such as particulate matter (PM), nitrogen oxides (NOx), and carbon monoxides (CO) and the like are contained in the exhaust gas from the engine 10. Therefore, as shown in FIG. 3, the exhaust gas purifying device 18 mounted on the exhaust pipe 12 is configured by an oxidation catalyst 20 for oxidizing and removing carbon monoxides (CO) or the like in the exhaust gas and the particulate matter removing filter 21, which will be described later, for trapping and removing the particulate matter (PM) in the exhaust gas.

Figure 3:
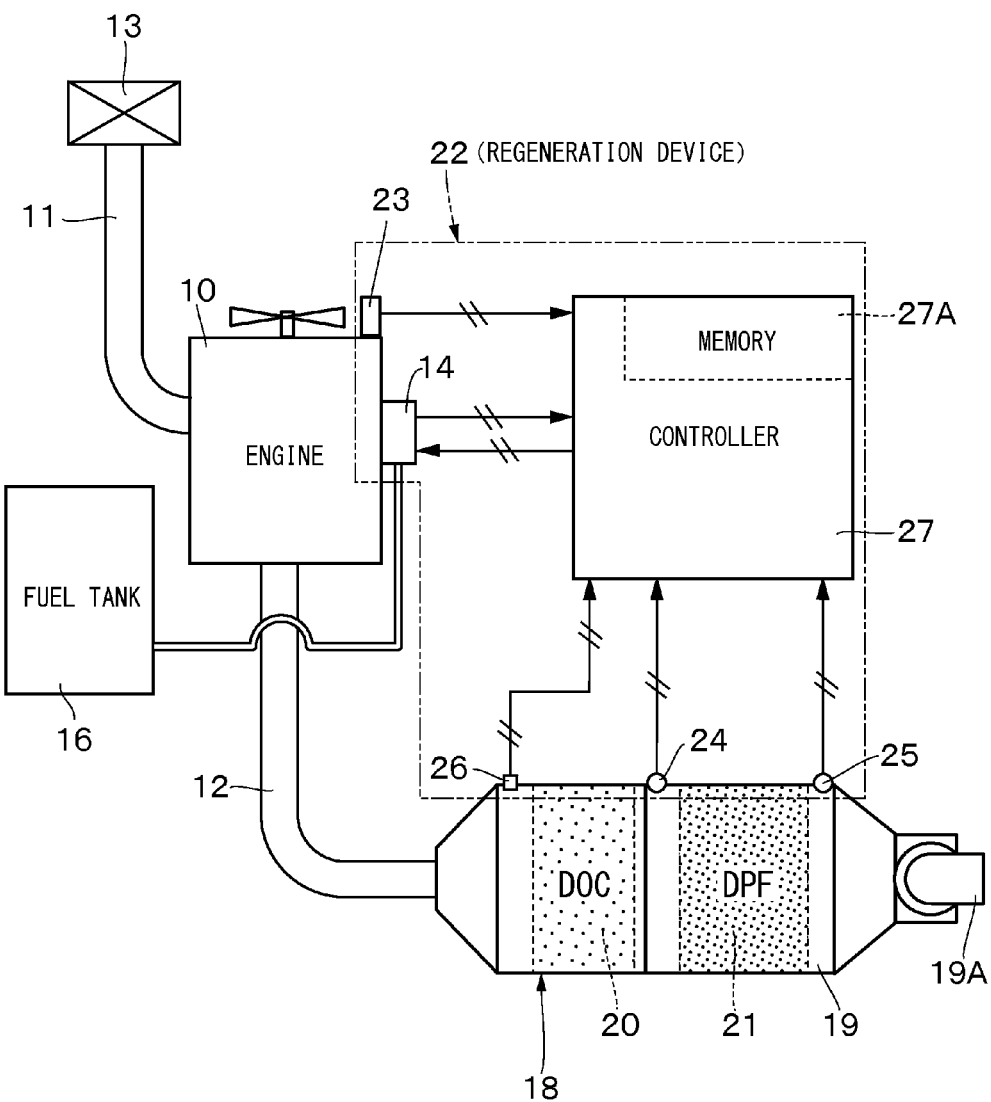

As shown in FIG. 3, the exhaust gas purifying device 18 is provided with a cylindrical casing 19 configured by removably connecting a plurality of cylinders in the front and rear direction, for example. The oxidation catalyst 20 called "DOC" and the particulate matter removing filter 21 called "DPF" (hereinafter called "filter 21") are removably accommodated in the casing 19. An outlet port 19A is connected to an outlet side of the casing 19 to be positioned downstream of the filter 21. This outlet port 19A is configured by, for example, a chimney for releasing the purified exhaust gas into an atmosphere, and a muffling device.

The oxidation catalyst 20 comprises a cell-shaped cylindrical body made of ceramic having an outer diameter dimension that is equivalent to an inner diameter dimension of the casing 19, for example. Many through holes (not shown) are axially formed in the oxidation catalyst 20, an inner surface of which is coated with noble metals. The oxidation catalyst 20 oxidizes and removes carbon monoxides (CO), hydrocarbon (HC), and the like contained in the exhaust gas by circulating the exhaust gas into each through hole under a predetermined temperature condition, and, for example, removes nitrogen monoxide (NO) as nitrogen dioxides ($NO_2$).

On the other hand, the filter 21 is arranged downstream side of the oxidation catalyst 20 in the casing 19. The filter 21 traps particulate matter in the exhaust gas discharged from the engine 10, and burns and removes the trapped particulate matter to perform purification of the exhaust gas. Therefore, the filter 21 is configured by a cell-shaped cylindrical body which is, for example, a porous member made of a ceramic material, having many small bores (not shown) in an axial direction. Thereby, the filter 21 traps particulate matter through many small bores, and the trapped particulate matter is burned and removed by regeneration treatment of the regeneration device 22 which will be described later. As a result, the filter 21 is regenerated.

Next, the regeneration device 22 for executing the regeneration treatment of the filter 21 will be explained.

That is, denoted at 22 is the regeneration device for executing the regeneration treatment of the filter 21 by burning the particulate matter trapped in the filter 21 in the exhaust gas purifying device 18. The regeneration device 22 includes the aforementioned fuel injection device 14, a rotational sensor 23, pressure sensors 24 and 25, an exhaust gas temperature sensor 26, and the controller 27, which will be described later. The regeneration device 22 automatically executes the regeneration treatment based upon the determination of the controller 27, that is, not based upon an operation by an operator. Specifically, the regeneration device 22 performs a post injection by the fuel injection device 14 in response to a command signal (control signal) of the controller 27. This post injection increases a temperature of an exhaust gas in the exhaust pipe 12 to burn and remove the particulate matter accumulated in the filter 21.

The rotational sensor 23 detects a rotational number (rotational speed) N of the engine 10, and the rotational sensor 23 detects the rotational number N of the engine 10 and outputs the detection signal to the controller 27 which will be described later. The controller 27 estimates a trapping amount of the particulate matter trapped in the filter 21 based upon an engine rotational number N detected by the rotational sensor 23, a fuel injection quantity F injected by the fuel injection device 14, and an exhaust temperature (exhaust gas temperature) T detected by the exhaust gas temperature sensor 26 which will be described later. Further, the controller 27 determines whether or not the regeneration treatment is executed based upon a first estimated trapping amount H1 which is the estimated trapping amount. It should be noted that the fuel injection quantity F can be found, for example, from an intake air quantity detected from an unshown air flow meter provided in the intake side of the engine 10 and an engine rotational number N, and besides, can be calculated also from a control signal (fuel injection command) that is output to the fuel injection device 14 from the controller 27, for example.

The pressure sensors 24 and 25 are provided in the casing 19 in the exhaust gas purifying device 18. As shown in FIG. 3, the pressure sensor 24 is arranged at an inlet side (upstream side) of the filter 21 and the pressure sensor 25 is arranged at an outlet side (downstream side) of the filter 21, which output the respective detection signals to the controller 27 which will be described later. The controller 27 calculates a differential pressure ΔP between a pressure P1 in the inlet side detected by the pressure sensor 24 and a pressure P2 in the outlet side detected by the pressure sensor 25, and estimates a trapping amount of the particulate matter in the filter 21 based upon the differential pressure ΔP, an exhaust gas temperature T, and an exhaust gas flow amount, and determines whether or not the regeneration treatment is executed based upon a second estimated trapping amount H2 that is the estimated trapping amount.

The exhaust gas temperature sensor 26 is a temperature detector that detects a temperature (exhaust gas temperature) T of an exhaust gas discharged from the engine 10. As shown in FIG. 3, the exhaust gas temperature sensor 26 is mounted to the casing 19 in the exhaust gas purifying device 18, and detects a temperature T of an exhaust gas discharged from the exhaust pipe 12 side, for example. The exhaust gas temperature T upstream of the filter 21 detected by the exhaust gas temperature sensor 26 is output to the controller 27, which will be described later, as a detection signal. The exhaust gas temperature T is used for estimation of a trapping amount of the particulate matter trapped in the filter 21, determination of interruption and the restart of the regeneration treatment, and the like.

The controller 27 includes a microcomputer, and the controller 27 is connected at the input side to the fuel injection device 14, the rotational sensor 23, the pressure sensors 24 and 25, the exhaust gas temperature sensor 26, the unshown air flow meter, and the like. The controller 27 is connected at the output side to the fuel injection device 14, and the like. The controller 27 has a memory 27A including a ROM and a RAM. Process programs for regeneration treatment shown in FIG. 4 and FIG. 5 which will be described later, a first map and a second map in advance produced for estimating a trapping amount of particulate matter, calculation formulas, and besides, as shown in FIG. 6, a preset regeneration start threshold Ht [g/l], a first regeneration terminated threshold He1[g/l], a second regeneration terminated threshold He2[g/l], an exhaust gas temperature threshold Tt[° C.] shown in FIG. 6, and the like are stored in the memory 27A.

Here, the first map is a map for finding a discharge amount Hm of particulate matter discharged from the engine 10 based upon at least a rotational number N of the engine 10 and a fuel injection quantity F. Specifically, the first map is a map that is produced based upon a corresponding relation between an engine rotational number N, a fuel injection quantity F, and a discharge amount Hm of particulate matter, for example which is in advance found by experiments, calculations, simulations and the like. The calculation formula for estimating the trapping amount can be expressed according to the following formula 1 in a case where a first estimated trapping amount is indicated at H1, a discharge amount of the particulate matter found by the first map is indicated at Hm and an amount (regeneration amount) of particulate matter removed from the filter 21 by the regeneration treatment is indicated at J.

$$H1 = Hm - J \qquad \text{[Formula 1]}$$

In this case, the amount of the particulate matter removed from the regeneration treatment, that is, the regeneration amount J can be calculated from, for example, a relation between a flow amount of an exhaust gas found by an engine rotational number N and a fuel injection quantity F, an exhaust gas temperature T, and a $NO_2$ conversion rate found by adding the exhaust gas temperature T to a discharge amount of nitrogen oxides (NOx) found by an engine rotational number N and a fuel injection quantity F.

On the other hand, the second map is used for estimating a trapping amount of particulate matter based upon a differential pressure ΔP across the filter 21. Specifically, the second map is a map that is produced based upon, for example, a corresponding relation between the differential pressure ΔP, an exhaust gas flow amount and a second estimated trapping amount H2, which is in advance found by experiments, calculations, simulations, and the like. It should be noted that the flow amount of the exhaust gas can be found, for example, by an engine rotational number N and a fuel injection quantity F. The differential pressure $\Delta P$ across the filter 21 can be calculated according to the following formula 2 in a case where the pressure in an inlet side detected by the pressure sensor 24 is indicated at P1 and the pressure in an outlet side detected by the pressure sensor 25 is indicated at P2.

$$\Delta P = P1 - P2 \qquad \text{[Formula 2]}$$

Next, by referring to FIG. 6, the regeneration start threshold Ht [g/l] is a threshold (regeneration start value) of an estimated trapping amount H for determining whether or not the regeneration treatment is started. That is, the regeneration start threshold Ht becomes a determination value for determining that the regeneration treatment is necessary when a first estimated trapping amount H1 estimated by the aforementioned first map and the calculation formula and/or a second estimated trapping amount H2 estimated by the aforementioned second map is equal to or more than the regeneration start threshold Ht. In other words, the regeneration start threshold Ht is a determination value for determining whether or not the particulate matter trapped in the filter 21 becomes a trapping amount necessary for the regeneration treatment of the filter 21. Therefore, the regeneration start threshold Ht is preliminarily set based upon experiments, calculations, simulations and the like such that the regeneration treatment can be executed in an appropriate state, that is, in a state where the particulate matter is sufficiently trapped in the filter 21. Thereby, it is possible to stably and automatically execute the regeneration treatment by the regeneration device 22 when the particulate matter is sufficiently trapped in the filter 21.

On the other hand, the first regeneration terminated threshold He1 is a threshold (normal terminated value) of an estimated trapping amount H for determining whether or not the regeneration treatment terminates when the regeneration treatment of the filter 21 is executed without the interruption, which will be described later. That is, the first regeneration terminated threshold He1 is a determination value for determining that the particulate matter in the filter 21 is sufficiently burned and removed when the first estimated trapping amount H1 estimated by the aforementioned first map and the calculation formula and/or the second estimated trapping amount H2 estimated by the aforementioned second map becomes equal to or less than the first regeneration terminated threshold He1 while the regeneration treatment of the filter 21 is executed without terminating along the way (without the interruption). In other words, the first regeneration terminated threshold He1 is a determination value for determining whether or not the amount of the particulate matter in the filter 21 is reduced to a sufficiently low remaining amount in a case where the regeneration treatment of the filter 21 normally terminates without the interruption.

Here, in case the first regeneration terminated threshold He1 is set to be smaller, the amount of the particulate matter that can be trapped in the filter 21 until the next regeneration treatment can be increased the more. That is, as the first regeneration terminated threshold He1 is set to be smaller, an interval to the start of the next regeneration treatment can be made the longer. Therefore, the first regeneration terminated threshold He1 is preliminarily set based upon experiments, calculations, simulations and the like such that the normal regeneration treatment without the interruption can terminate in an appropriate state (in an appropriate remaining amount).

On the other hand, the second regeneration terminated threshold He2[g/l] is a threshold (restart terminated value) of an estimated trapping amount H for determining whether or not the restarted regeneration treatment terminates when the regeneration treatment of the filter 21 is interrupted and thereafter is restarted. That is, the second regeneration terminated threshold He2 is a determination value for determining to terminate the restarted regeneration treatment when the first estimated trapping amount H1 estimated by the aforementioned first map and the calculation formula and/or the second estimated trapping amount H2 estimated by the aforementioned second map becomes equal to or less than the second regeneration terminated threshold He2 in a case where the regeneration treatment of the filter 21 is interrupted and thereafter is restarted. In other words, the second regeneration terminated threshold He2 is a determination value for determining whether or not the amount of the particulate matter in the filter 21 is reduced to a desired remaining amount in a case of terminating the restarted regeneration treatment.

Here, as similar to the first regeneration terminated threshold He1, in case the second regeneration terminated threshold He2 also is set to be smaller, the amount of the particulate matter that can be trapped in the filter 21 until the next regeneration treatment can be increased the more. That is, in case the second regeneration terminated threshold He2 is set to be smaller, an interval to the start of the next regeneration treatment can be made the longer. However, as the second regeneration terminated threshold He2 is set to be small (for example, is set to the same value as the first regeneration terminated threshold He1), the restarted regeneration treatment possibly continues to be excessively executed (the regeneration treatment time becomes longer).

Therefore, in the present embodiment, the second regeneration terminated threshold (restart terminated value) He2 is set to a value between the regeneration start threshold (regeneration start value) Ht and the first regeneration terminated threshold (normal terminated value) He1. In other words, the second regeneration terminated threshold He2 is set to a value larger than the first regeneration terminated threshold He1 and smaller than the regeneration start threshold Ht. The second regeneration terminated threshold He2 also is preliminarily set based upon experiments, calculations, simulations and the like such that the restarted regeneration treatment can terminate in an appropriate state (the regeneration time does not become excessively long).

The exhaust gas temperature threshold Tt is a threshold of an exhaust gas temperature T for determining whether or not the regeneration treatment is interrupted. That is, when the exhaust gas temperature T is less than the preset exhaust gas temperature threshold Tt at the time of executing the regeneration treatment of the filter 21, the regeneration treatment is interrupted even if the estimated trapping amount H is not reduced below the first regeneration terminated threshold He1 or the second regeneration terminated threshold He2. The reason for it is to block a state where even if the regeneration treatment continues to be executed in a state where the exhaust gas temperature T is low, the particulate matter cannot be sufficiently burned or removed and the fuel consumption quantity increases due to the post injection, but the burning and the removal of the particulate matter do not progress. The exhaust gas temperature threshold Tt is preliminarily set based upon experiments, calculations, simulations and the like in such a manner as to be a boundary value of the exhaust gas temperature T for obtaining an allowable efficiency on the regeneration treatment, for example.

The controller 27 performs control of automatic regeneration treatment for automatically executing regeneration treatment according to process programs in FIG. 4 and FIG. 5 which will be described later without an operation by an operator. In this case, the controller 27 performs the processes (control) of start and termination of the regeneration treatment based upon a trapping amount of the particulate matter trapped in the filter 21, and besides, performs the processes (control) of interruption and restart of the regeneration treatment based upon an exhaust gas temperature T.

That is, the controller 27 estimates a trapping amount of the particulate matter trapped in the filter 21 (PM calculating unit). The estimation of this trapping amount can be made based upon at least an engine rotational number N, a fuel injection quantity F and an exhaust gas temperature T (first estimating unit). In addition, the estimation of the trapping amount can be made based upon at least a differential pressure $\Delta P$ across the filter 21 (second estimating unit). The estimation of the trapping amount can be made based upon any or both of the first estimating unit and the second estimating unit. The estimation of the trapping amount can be made based upon the estimating unit with higher accuracy at this time according to operating conditions. Further, the trapping amount of particulate matter may be estimated by an estimating unit other than the first and second estimating units.

If anywhere, when the estimated trapping amount is indicated at an estimated trapping amount H, the controller 27 determines whether or not the regeneration treatment of the filter 21 is started using the estimated trapping amount H (regeneration start determining unit). Specifically, when the estimated trapping amount H, more specifically at least one of a first estimated trapping amount H1 estimated by the first estimating unit and a second estimated trapping amount H2 estimated by the second estimating unit is equal to or more than a regeneration start threshold Ht, the controller 27 determines to start the regeneration treatment of the filter 21. Next, the controller 27 outputs, for example, a control signal of performing a post injection is output to the fuel injection device 14 based upon the determination of the regeneration start (being equal to or more than the regeneration start threshold Ht) to start the control of the automatic regeneration treatment for automatically executing the regeneration treatment without the operation of the operator.

On the other hand, the controller 27 determines whether or not the regeneration treatment of the filter 21 is started using the estimated trapping amount H (regeneration termination determining unit). For example, when the estimated trapping amount H (at least one of the first estimated trapping amount H1 and the second estimated trapping amount H2) is equal to or less than a regeneration terminated threshold (a first regeneration terminated threshold He1 or a second regeneration terminated threshold He2), the controller 27 determines to terminate the regeneration treatment of the filter 21. The controller 27, upon determining to terminate the regeneration treatment (being equal to or less than the regeneration terminated threshold), for example, outputs a control signal of terminating the post injection to the fuel injection device 14 to terminate the control of the automatic regeneration treatment.

Figure 6:
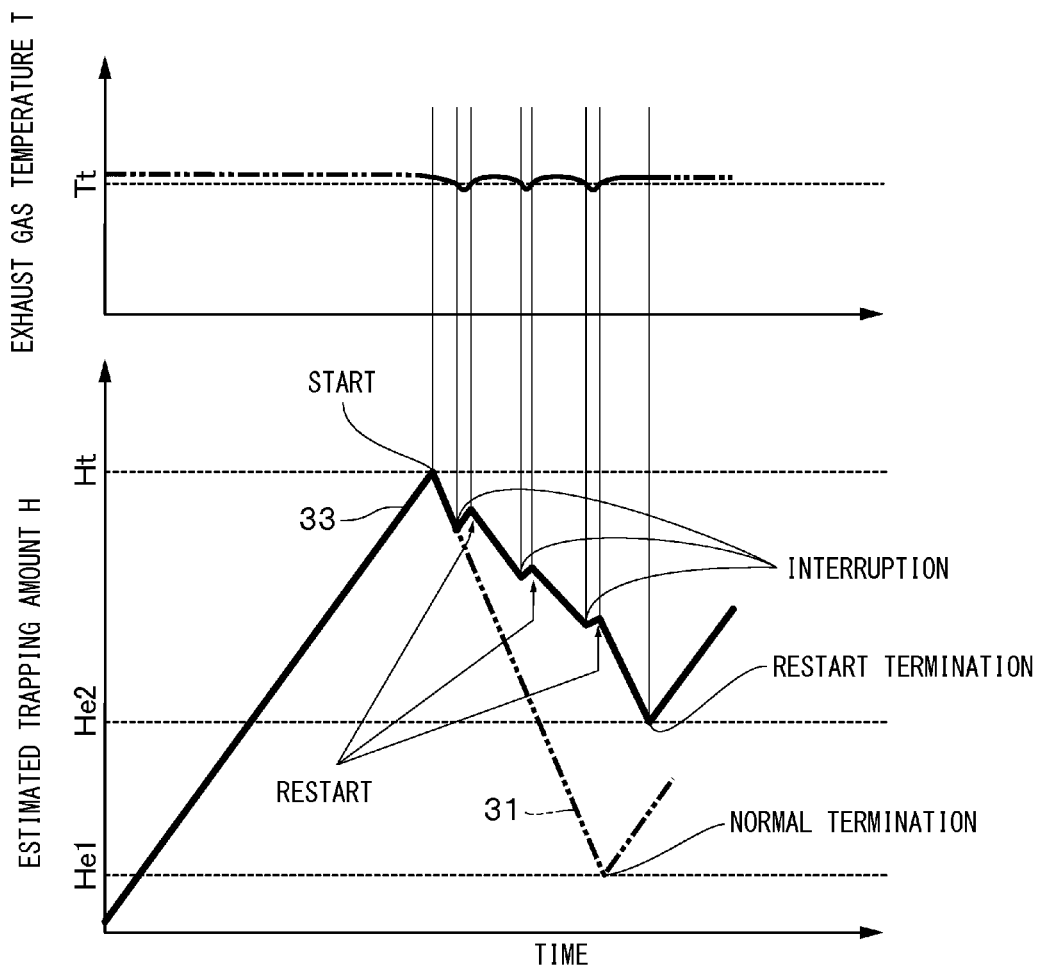
FIG. 6 is a characteristic line diagram showing an example of a change with time of an estimated trapping amount and an exhaust gas temperature according to the first embodiment.
Figure 7:
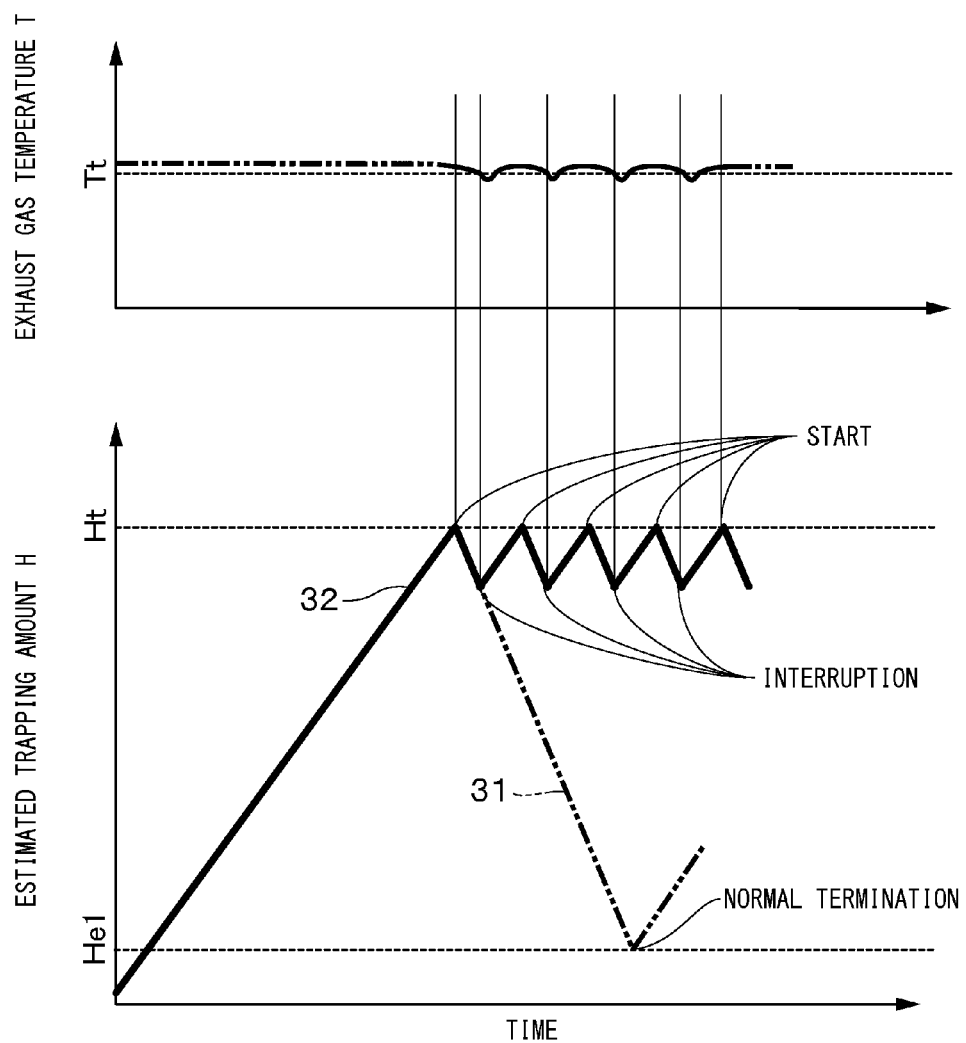
FIG. 7 is a characteristic line diagram showing an example of a change with time of an estimated trapping amount and an exhaust gas temperature according to a comparative example.

Incidentally, the regeneration treatment of the filter 21 is executed until the estimated trapping amount H (the first estimated trapping amount H1 or the second estimated trapping amount H2) is equal to or less than the first regeneration terminated threshold He1 as shown in a characteristic line 31 in a dash-two dotted line in FIG. 6 and FIG. 7 when the exhaust gas temperature T is sufficiently high. It should be noted that a characteristic diagrammatic view in FIG. 6 shows an example of a change with time of the estimated trapping amount H and the exhaust gas temperature T according to the present embodiment. On the other hand, a characteristic diagrammatic view in FIG. 7 shows an example of a change with time of an estimated trapping amount H and an exhaust gas temperature T according to a comparative example. According to the present embodiment, as described later, when the regeneration treatment terminates (is interrupted) along the way since the exhaust gas temperature T is low, the regeneration restart process which will be described later is executed. On the other hand, in the comparative example, even if the regeneration treatment terminates (is interrupted) along the way since the exhaust gas temperature T is low, the regeneration restart process as the present embodiment is not executed, but the regeneration treatment starts when the estimated trapping amount H is equal to or more than the regeneration start threshold Ht.

Here, for example, when the regeneration treatment of the filter 21 is executed in a case where the construction machine performs a light-load work or there is kept a low rotational state (low idle state) where a rotational number N of the engine 10 is low, the exhaust gas temperature T does not rise sufficiently. Therefore, the regeneration treatment terminates (is interrupted) along the way. The reason for it is that in a case where the exhaust gas temperature T does not rise sufficiently, even if the regeneration treatment continues to be executed, there is a possibility that the particulate matter cannot be sufficiently burned. However, upon simply terminating the regeneration treatment along the way, in a case where the light-load work or the state of the low rotational speed of the engine continues, the regeneration operation and the regular operation are alternately repeated by short intervals as shown in a solid characteristic line 32 in FIG. 7 as the comparative example.

That is, when the estimated trapping amount H reaches the regeneration start threshold Ht, the regeneration treatment is started, and after that, when the exhaust gas temperature T is less than the exhaust gas temperature threshold Ht, the regeneration treatment terminates (is interrupted) along the way. On the other hand, when the estimated trapping amount H again reaches the regeneration start threshold Ht, the regeneration treatment is started. Thereby, the regeneration operation and the regular operation are alternately repeated by short intervals. When the regeneration operation and the regular operation are alternately repeated by short intervals for a long period of time, this possibly leads to, for example, an increase in fuel consumption quantity with an increase of post injections, excessive accumulation of particulate matter due to the insufficient burning, and deterioration of working conditions by the exhaust gas. In addition to this, uncomfortable feelings are possibly given to an operator following a change in engine sounds at the time of switching the regular operation and the regeneration operation. Further, there is a possibility that fuel having adhered to a cylinder inner wall of an engine due to the post injection falls down into an oil pan, which is then mixed with engine oil, leading to dilution of the engine oil.

Particularly, in the hydraulic excavator 1, in a case where hydraulic actuators (swing cylinder 5E, boom cylinder 5F, arm cylinder 5G, bucket cylinder 5H, travelling hydraulic motor, revolving hydraulic motor and the like) continue to stop for a predetermined time, the rotational number N of the engine 10 is automatically kept to be in a low rotational state (low idle state) by the auto idle control. In this case, when the regeneration treatment is started, there occurs a high possibility of creating the aforementioned problem.

Therefore, in the present embodiment, the controller 27 determines whether or not the regeneration treatment of the filter 21 is interrupted using the exhaust gas temperature T, and besides, determines whether or not the interrupted regeneration treatment is restarted. That is, the controller 27 determines to interrupt the regeneration treatment of the filter 21 when the exhaust gas temperature T becomes less than the exhaust gas temperature threshold Tt in the middle of executing the regeneration treatment of the filter 21 (regeneration interruption determining unit). In addition thereto, the controller 27 determines to restart the regeneration treatment of the filter 21 when the exhaust gas temperature T becomes equal to or more than the exhaust gas temperature threshold Tt in a case where the regeneration treatment of the filter 21 is interrupted (regeneration restart determining unit). The regeneration treatment including the determination on the interruption and the determination on the restart of such regeneration treatment will be described later with reference to FIG. 4 and FIG. 5.

In the present embodiment, as shown in the solid characteristic line 33 in FIG. 6, when the exhaust gas temperature T is equal to or more than the exhaust gas temperature threshold Tt, the regeneration treatment can be restarted to accelerate the burning and the removal of the particulate matter trapped in the filter 21. Therefore, it is possible to suppress that the regeneration operation and the regular operation are alternately repeated by short intervals for a long period of time as shown in the solid characteristic line 32 in FIG. 7. In addition, the second regeneration terminated threshold He2 as a threshold of the estimated trapping amount H in a case of terminating the restarted regeneration treatment is set to be larger than the first regeneration terminated threshold He1 as a threshold of the estimated trapping amount H in a case where the regeneration treatment normally terminates without the interruption of the regeneration treatment. Therefore, even in a case where the exhaust gas temperature T tends to be difficult in rising due to the continuation of the light-load work or the low rotational state, it is possible to suppress the restarted regeneration treatment from excessively continuing (the regeneration time from being longer).

The hydraulic excavator 1 according to the first embodiment has the configuration as described above, and, next, an operation thereof will be explained.

An operator of the hydraulic excavator 1 gets on the cab 8 of the upper revolving structure 4, and starts the engine 10 to drive the hydraulic pump 15. Thereby, pressurized oil from the hydraulic pump 15 is delivered through control valves to various actuators. When the operator having gotten on the cab 8 operates an operating lever for traveling, the lower traveling structure 2 can go forward or backward.

On the other hand, when the operator in the cab 8 operates an operating lever for working, the working mechanism 5 can be tilted to perform an excavating work of sand and earth or the like. In this case, since a revolving radius by the upper revolving structure 4 is small, the compact hydraulic excavator 1 can perform a ditch excavating work while revolving the upper revolving structure 4 even in a narrow working site such as an urban area, for example.

At the operating of the engine 10, the particulate matter that is harmful substances is discharged from the exhaust pipe 12. At this time, the exhaust gas purifying device 18 can oxidize and remove hydrocarbon (HC), nitrogen oxides (NOx), and carbon monoxides (CO) in an exhaust gas by the oxidation catalyst 20. The filter 21 traps the particulate matter contained in the exhaust gas. Thereby, the purified exhaust gas can be discharged through the downstream outlet port 19A to an outside. Further, the trapped particulate matter is burned and removed by the regeneration device 22 to regenerate the filter 21.

Next, an explanation will be made of the regeneration treatment to be executed by the regeneration device 22 with reference to the flow chart of each in FIG. 4 and FIG. 5. It should be noted that the process of each in FIG. 4 and FIG. 5 is repeatedly executed every predetermined time (by a predetermined sampling frequency) by the controller 27 while supplying power to the controller 27.

Power supply to an accessory or start of the engine 10 (ON of ignition) activates the controller 27. When the process operation in FIG. 4 starts with this activation, at step 1, estimation of the trapping amount of particulate matter is made. The estimation of this trapping amount can be made by at least one of the following (a) or (b).

(a). A trapping amount of particulate matter trapped in the filter 21, that is, a first estimated trapping amount H1 is estimated (calculated) based upon an engine rotational number N of the engine 10, a fuel injection quantity F injected from the fuel injection device 14 and an exhaust gas temperature T of an exhaust gas discharged from the engine 10.

(b). A trapping amount of particulate matter trapped in the filter 21, that is, a second estimated trapping amount H2 is estimated (calculated) based upon a differential pressure $\Delta P$ across the filter 21.

Here, the first estimated trapping amount H1 in the above (a) can be estimated using the first map and the calculation formula stored in the memory 27A in the controller 27. That is, a discharge amount per unit time is found using the aforementioned first map from the engine rotational number N and the fuel injection quantity F, and a total discharge amount Hm from the operating start to the present point is found by integrating the discharge amounts. Specifically, the first estimated trapping amount H1 at the present point can be estimated by subtracting a regeneration amount J of particulate matter that has been removed by the regeneration treatment until the present point from the total discharge amount Hm based upon the aforementioned formula 1. It should be noted that the engine rotational number N is read in from the rotational sensor 23. The fuel injection quantity F can be found by, for example, an intake air quantity detected from the air flow meter (not shown) that is provided in the intake side of the engine 10 and an engine rotational number N. Further, the fuel injection quantity F can also be calculated from, for example, a control signal (fuel injection command) that is output to the fuel injection device 14 from the controller 27. The exhaust gas temperature T is read in from the exhaust gas temperature sensor 26.

The second estimated trapping amount H2 in the above (b) can be estimated using the aforementioned second map stored in the memory 27A in the controller 27. That is, the second estimated trapping amount H2 at this point can be estimated based upon the second map of associating a differential pressure $\Delta P$, an exhaust gas flow amount and an estimated trapping amount H. It should be noted that the differential pressure $\Delta P$ can be calculated using the aforementioned formula 2 from the pressure P1 in the upstream side of the filter 21 read in by the pressure sensor 24 and the pressure P2 in the downstream side of the filter 21 read in by the pressure sensor 25.

When at step 1, the estimated trapping amount H (at least one of the first estimated trapping amount H1 and the second estimated trapping amount H2) is found, the process goes to step 2. At step 2, it is determined whether or not the automatic regeneration treatment is executed. Specifically, it is determined whether or not the automatic regeneration treatment is executed depending upon whether or not the estimated trapping amount H is equal to or more than the preset regeneration start threshold Ht, for example. When at step 2, the determination is made as "NO", that is, it is determined that the estimated trapping amount H is smaller than the preset regeneration start threshold Ht, it is estimated that the particulate matter is not trapped in the filter 21 to the extent that the regeneration treatment is necessary for the filter 21 (the filter 21 is not clogged). In this case, the process goes back to a state before step 1, and the process from step 1 is repeated.

On the other hand, in a case where, at step 2, the determination is made as "YES", that is, the estimated trapping amount H is determined to be equal to or more than the regeneration start threshold Ht, it is estimated that the particulate matter is trapped in the filter 21 to the extent that the regeneration treatment is necessary for the filter 21. Therefore, in this case, the process goes to step 3. At step 3, the regeneration treatment of the filter 21 is started. That is, at step 3, a control signal of performing the post injection is output to the fuel injection device 14 from the controller 27. This post injection rises the exhaust gas temperature T from the engine 10 to burn the particulate matter trapped in the filter 21 for removal.

At the subsequent step 4, it is determined whether or not the regeneration treatment is interrupted based upon the exhaust gas temperature T. That is, when the regeneration treatment continues to be executed in a state where the exhaust gas temperature T is kept to be low, the fuel consumption quantity increases due to the post injection, but there is a possibility that the burning and removal of the particulate matter does not progress. Therefore, at step 4, it is determined whether or not the exhaust gas temperature T is equal to or more than the exhaust gas temperature threshold Tt. The exhaust gas temperature T is read in from the exhaust gas temperature sensor 26.

In a case where, at step 4, the determination is made as "YES", that is, it is determined that the exhaust gas temperature T is equal to or more than the exhaust gas temperature threshold Tt, the process goes to step 5. At step 5, as similar to the aforementioned step 1, the estimation of the trapping amount of the particulate matter is made. At the subsequent step 6, it is determined whether or not the automatic regeneration treatment terminates based upon the estimated trapping amount found at step 5. That is, at step 6, it is determined whether or not the regeneration treatment terminates depending upon whether or not the estimated trapping amount H is equal to or less than a preset first regeneration terminated threshold He1.

In a case where, at step 6, the determination is made as "NO", that is, it is determined that the estimated trapping amount H is larger than the first regeneration terminated threshold He1, it is estimated that the amount of the particulate matter burned and removed by the regeneration treatment is not still sufficient, in other words, the amount of the particulate matter remaining in the filter 21 is large. In this case, the process goes back to a state before step 4, and the process from step 4 is repeated.

On the other hand, in a case where, at step 6, the determination is made as "YES", that is, it is determined that the estimated trapping amount H is equal to or less than the first regeneration terminated threshold He1, it is estimated that the particulate matter in the filter 21 is sufficiently burned and removed by the regeneration treatment. In this case, the process goes to step 7. At step 7, the regeneration treatment terminates. That is, at step 7, a control signal of terminating the post injection is output to the fuel injection device 14 from the controller 27. As a result, the regeneration treatment terminates, the process goes back to Start through Return, and the process from step 1 is repeated.

On the other hand, in a case where, at step 4, the determination is made as "NO", that is, it is determined that the exhaust gas temperature T is less than the exhaust gas temperature threshold Tt, the process goes to a regeneration interruption restart process of step 8. In this case, the exhaust gas temperature T is low, and even if the regeneration treatment continues to be executed as it is, it is estimated that the sufficient burning of the particulate matter is not expected. Therefore, the process goes to step 8 to perform the interruption of the regeneration treatment and the restart thereafter.

Figure 5:
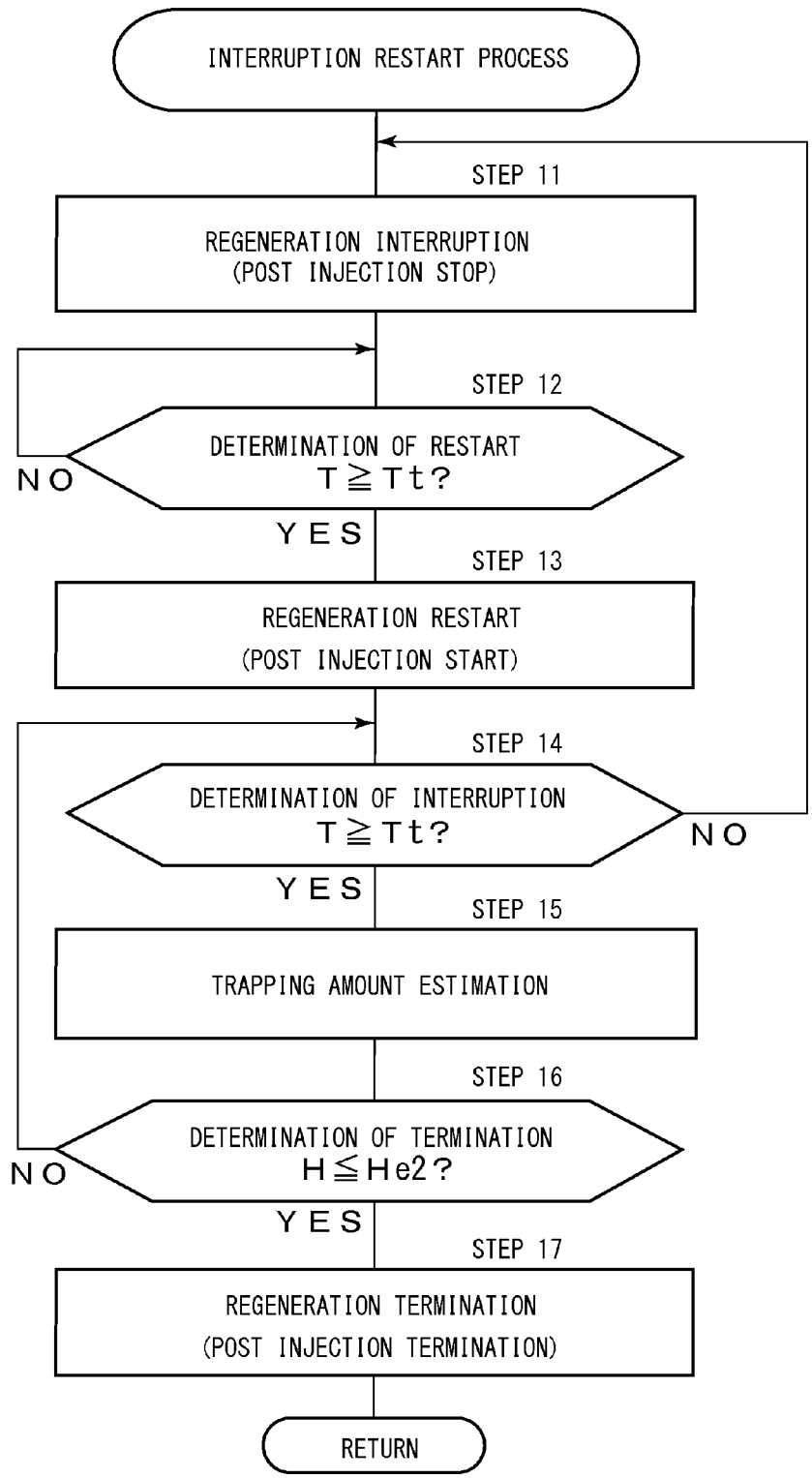
FIG. 5 is a flow chart showing an interruption restart process by step 8 in FIG. 4.

The regeneration interruption restart process of step 8 is composed of step 11 to step 17 shown in FIG. 5. That is, at step 11, the regeneration treatment is interrupted since the exhaust gas temperature T is less than the exhaust gas temperature threshold Tt. Specifically, a control signal of interrupting (temporarily terminating) the post injection is output to the fuel injection device 14 from the controller 27. As a result, the regeneration treatment is interrupted.

At the subsequent step 12, it is determined whether or not the regeneration treatment is restarted based upon the exhaust gas temperature T. That is, when the regeneration treatment is restarted at a point where the exhaust gas temperature T is high, it is possible to accelerate the burning and removal of the particulate matter trapped in the filter 21. Therefore, at step 12, it is determined whether or not the exhaust gas temperature T is equal to or more than the exhaust gas temperature threshold Tt.

In a case where, at step 12, the determination is made as "NO", that is, it is determined that the exhaust gas temperature T is less than the exhaust gas temperature threshold Tt, even if the regeneration treatment of the filter 21 is restarted, since the sufficient burning of the particulate matter is not expected, the process waits at step 12 (the process of step 12 is repeated).

On the other hand, in a case where, at step 12, the determination is made as "YES", that is, it is determined that the exhaust gas temperature T is equal to or more than the exhaust gas temperature threshold Tt, the process goes to step 13, wherein the regeneration treatment is restarted. That is, at step 13, a control signal of performing the post injection is output to the fuel injection device 14 from the controller 27. This post injection burns the particulate matter accumulated in the filter 21 for removal.

At the subsequent step 14, it is determined whether or not the regeneration treatment is interrupted based upon the exhaust gas temperature T. That is, when the restarted regeneration treatment continues to be executed in a state where the exhaust gas temperature T is kept to be low, the fuel consumption quantity increases due to the post injection, but there is a possibility that the burning and removal of the particulate matter does not progress. Therefore, at step 14, as similar to the aforementioned step 12, it is determined whether or not the exhaust gas temperature T is equal to or more than the exhaust gas temperature threshold Tt.

In a case where, at step 14, the determination is made as "YES", that is, it is determined that the exhaust gas temperature T is equal to or more than the exhaust gas temperature threshold Tt, the process goes to step 15. At step 15, as similar to the aforementioned step 1 and step 5, the estimation of the trapping amount of the particulate matter is made. At the subsequent step 16, it is determined whether or not the restarted regeneration treatment terminates based upon the estimated trapping amount H found at step 15. That is, at step 16, it is determined whether or not the restarted regeneration treatment terminates depending upon whether or not the estimated trapping amount H is equal to or less than a preset second regeneration terminated threshold He2.

In a case where, at step 16, the determination is made as "NO", that is, it is determined that the estimated trapping amount H is larger than the second regeneration terminated threshold He2, it is estimated that the amount of the particulate matter burned and removed by the regeneration treatment is not still sufficient, in other words, the amount of the particulate matter remaining in the filter 21 is still large. In this case, the process goes back to a state before step 14, and the process from step 14 is repeated.

On the other hand, in a case where, at step 16, the determination is made as "YES", that is, it is determined that the estimated trapping amount H is equal to or less than the second regeneration terminated threshold He2, it is estimated that the amount of the particulate matter in the filter 21 is sufficiently burned and removed by the restarted regeneration treatment. In this case, the process goes to step 17. At step 17, the regeneration treatment terminates as similar to the aforementioned step 7. That is, at step 17, a control signal of terminating the post injection is output to the fuel injection device 14 from the controller 27. As a result, the regeneration treatment terminates, the process goes back to Start through Return in FIG. 5 and Return in FIG. 4, and the process from step 1 is repeated.

On the other hand, in a case where, at step 14, the determination is made as "NO", that is, it is determined that the exhaust gas temperature T is less than the exhaust gas temperature threshold Tt, the process goes back to a state before step 11. That is, since the exhaust gas temperature T is equal to or more than the exhaust gas temperature threshold Tt, the regeneration treatment is restarted, but thereafter, the exhaust gas temperature T becomes less than the exhaust gas temperature threshold Tt, and even if the restarted regeneration treatment continues to be executed, it is estimated that the sufficient burning of the particulate matter is not expected. Therefore, the process goes back to a state before step 11 to repeat the process from step 11 (processes of interruption and restart of the regeneration treatment).

Thus, according to the first embodiment, when the exhaust gas temperature T becomes less than the exhaust gas temperature threshold Tt during a period of executing the regeneration treatment of the filter 21, at the process of step 4, it is determined to interrupt the regeneration treatment of the filter 21, and at the process of the subsequent step 8, more specifically, at the process of step 11, the regeneration treatment of the filter 21 is interrupted. Thereby, the exhaust gas temperature T is low, and when the sufficient burning of the particulate matter is not expected, at the process of step 4 and at the process of the subsequent step 11, the regeneration treatment of the filter 21 is interrupted. As a result, it is possible to suppress the increase of the fuel consumption quantity and the dilution of the engine oil due to the mixing of the fuel with the engine oil.

On the other hand, when, at the process of step 4 and at the process of the subsequent step 11, the regeneration treatment of the filter 21 is interrupted, the next regeneration treatment is started not when the estimated trapping amount H of the particulate matter in the filter 21 is equal to or more than the regeneration start threshold Ht, but when the exhaust gas temperature T is equal to or more than the exhaust gas temperature Threshold Tt. That is, even in a case where the exhaust gas temperature T is low to interrupt the regeneration treatment, when the exhaust gas temperature T is equal to or more than the exhaust gas temperature threshold Tt, at the process of step 12 and at the process of the subsequent step 13, the regeneration treatment is restarted.

Therefore, it is possible to suppress the regular operation from continuing to be performed until the estimated trapping amount H is equal to or more than the preset regeneration start value Ht. In other words, even if the regeneration treatment is interrupted due to the lowering of the exhaust gas temperature T, when, at the process of step 12 and at the process of the subsequent step 13, the regeneration treatment is restarted, as shown in the characteristic line 33 in FIG. 6, it is possible to accelerate the burning and removal of the particulate matter trapped in the filter 21.

This can suppress the regeneration operation and the regular operation each having the short interval from being repeated for a long period of time to suppress deterioration of working conditions or giving uncomfortable feelings to an operator, as shown in a solid characteristic line 32 in FIG. 7 as the comparative example. In addition, a reduction of the fuel consumption quantity (low fuel consumption), suppression of the excessive accumulation and suppression of oil dilution can be achieved to improve stability and reliability of the regeneration device 22, finally the hydraulic excavator 1.

According to the first embodiment, whether or not the regeneration treatment restarted at the process of step 12 and at the process of the subsequent step 13 terminates is determined based upon the process of step 16, that is, the estimated trapping amount H is equal to or less than the second regeneration terminated threshold He2. On the other hand, when, at step 4, the determination is not made as "NO", that is, the regeneration treatment advances without the interruption of the regeneration treatment, whether or not the regeneration treatment terminates is determined based upon the process of step 6, that is, whether or not the estimated trapping amount H is equal to or less than the first regeneration terminated threshold He1.

Here, the second regeneration terminated threshold (restart terminated value) He2 is set between the regeneration start threshold (regeneration start value) Ht and the first regeneration terminated threshold (normal terminated value) He1. In other words, the second regeneration terminated threshold He2 is set to a value larger than the first regeneration terminated threshold He1 and smaller than the regeneration start threshold Ht. Therefore, even if the exhaust gas temperature T tends to be difficult to rise due to the continuation of the light-load work or low rotational state, it is possible to suppress the regeneration treatment restarted at the process of step 12 and at the process of the subsequent step 13 from excessively continuing (the regeneration treatment from being longer). That is, as compared to a case of setting the second regeneration terminated threshold He2 to be equal to the first regeneration terminated threshold He1, the restarted regeneration treatment can terminate earlier. As a result, it is possible to suppress uncomfortable feelings from being given to an operator from this point of view as well.

Figure 4:
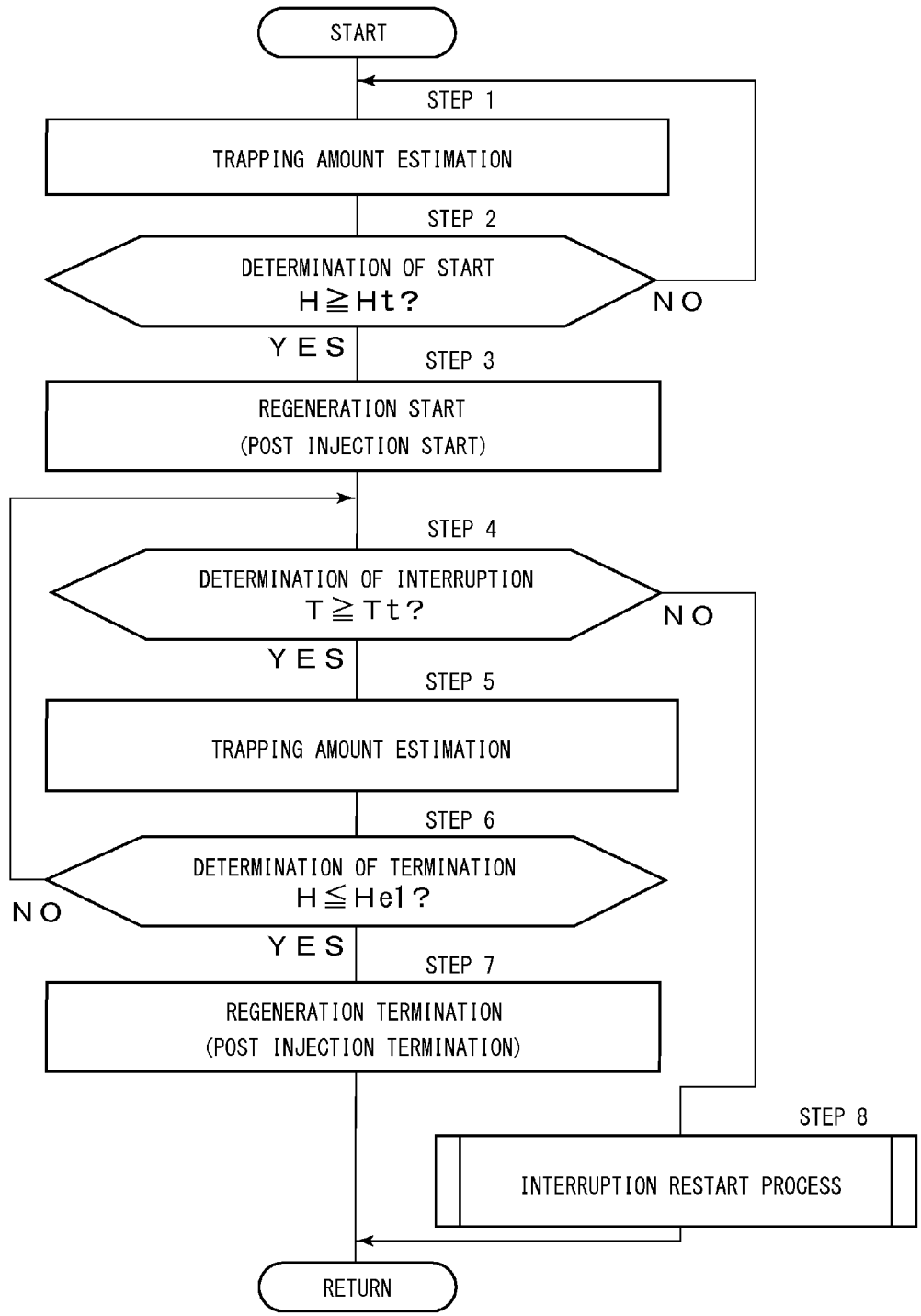
FIG. 4 is a flow chart showing regeneration treatment of a filter by the regeneration device.

It should be noted that in the first embodiment, the processes at step 1 and step 5 in FIG. 4, and at step 15 in FIG. 5 show a specific example of the PM calculating unit that is an element of the present invention, and the process at step 2 in FIG. 4 shows a specific example of the regeneration start determining unit. Further, the process at step 4 in FIG. 4 and the process at step 14 in FIG. 5 show a specific example of the regeneration interruption determining unit that is an element of the present invention, and the process at step 12 in FIG. 5 shows a specific example of the regeneration restart determining unit. The process at step 6 in FIG. 4 and the process at step 16 in FIG. 5 correspond to a specific example of the regeneration termination determining unit.

Figure 8:
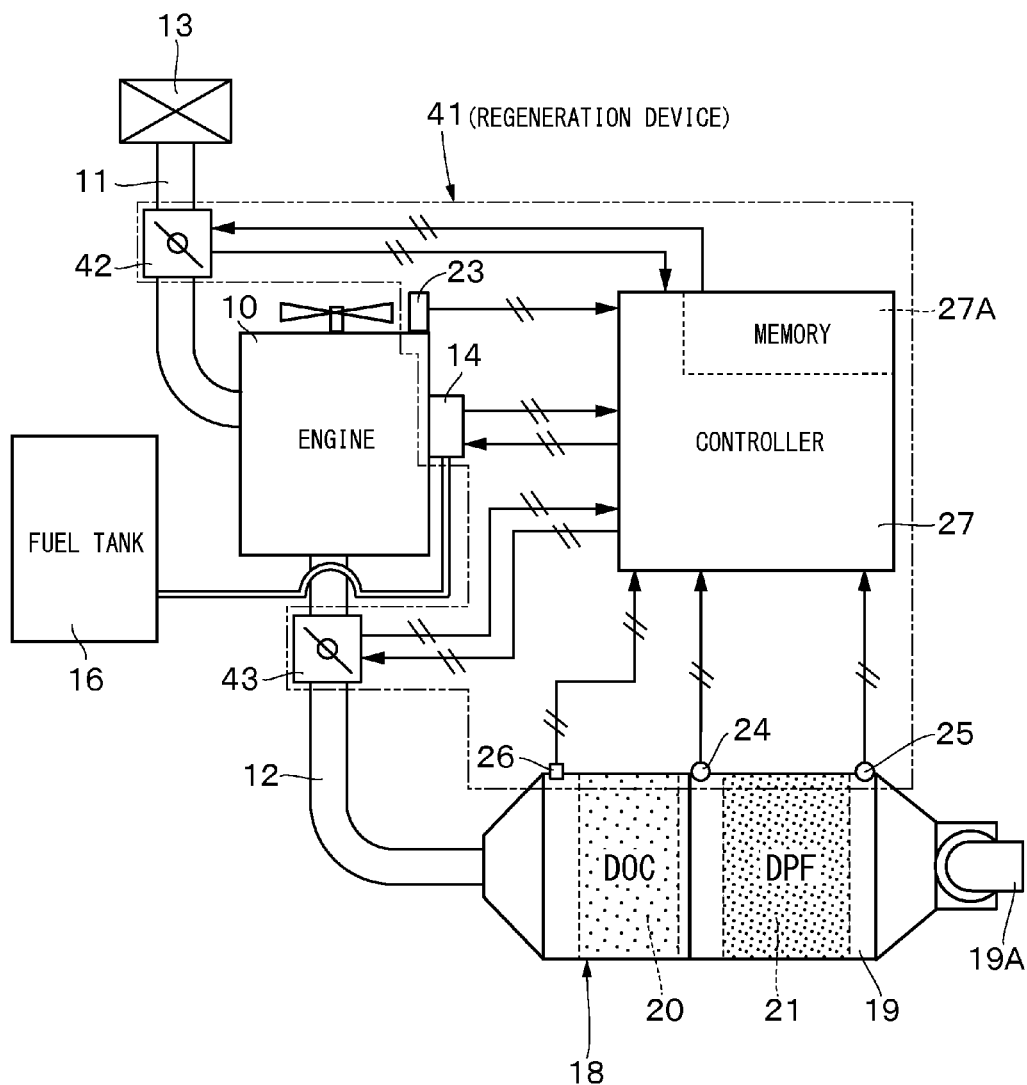
FIG. 8 is a circuit configuration diagram showing an engine, an exhaust gas purifying device, a regeneration device, and the like according to a second embodiment of the present invention.

Next, FIG. 8 shows a second embodiment in the present invention. The second embodiment is characterized by executing regeneration treatment, not by performing the post injection, but by driving at least one of an intake throttle valve provided in an intake side of an engine and an exhaust throttle valve provided in an exhaust side thereof in a direction of throttling a flow passage thereof. It should be noted that in the second embodiment, components identical to those in the aforementioned first embodiment are referred to as identical reference numerals, and an explanation thereof is omitted.

In the figure, designated at 41 is a regeneration device for executing the regeneration treatment of the filter 21 by burning the particulate matter trapped in the filter 21. The regeneration device 41 includes the fuel injection device 14, an intake throttle valve 42, an exhaust throttle valve 43, the rotational sensor 23, the pressure sensors 24 and 25, the exhaust gas temperature sensor 26, and the controller 27. The regeneration device 41, at the time of executing the regeneration treatment, drives at least one of the intake throttle valve 42 and the exhaust throttle valve 43 in the direction of throttling the flow passage thereof to burn and remove the particulate matter accumulated in the filter 21.

The intake throttle valve 42 is provided in the intake pipe 11 side of the engine 10, and forms part of the regeneration device 41 for executing the regeneration treatment of the filter 21. Here, the intake throttle valve 42 is regularly held in an opened state in response to a control signal from the controller 27 (for example, in an opening degree corresponding to a fuel injection quantity F or in a fully opened state). On the other hand, at the time of executing the regeneration treatment, the intake throttle valve 42 is driven in the direction of throttling the flow passage by the control signal from the controller 27.

Thereby, the intake throttle valve 42 throttles an intake air quantity such that an air-fuel ratio of air and fuel becomes in a richer side. At this time, a temperature of an exhaust gas discharged to the exhaust pipe 12 side rises in a combustion chamber in the engine 10 by burning the fuel the air-fuel ratio of which has become in the richer side, thus making it possible to burn and remove the particulate matter trapped in the filter 21.

The exhaust throttle valve 43 is provided in the exhaust pipe 12 side of the engine 10, and the exhaust throttle valve 43 also forms part of the regeneration device 41 for executing the regeneration treatment of the filter 21. Here, the exhaust throttle valve 43 is regularly held in a fully opened state in response to a control signal from the controller 27. On the other hand, at the time of executing the regeneration treatment, the exhaust throttle valve 43 is driven in the direction of throttling the flow passage in response to the control signal from the controller 27 to perform control of throttling the opening degree to be smaller.

Thereby, the exhaust throttle valve 43 throttles a flow amount of an exhaust gas flowing in the exhaust pipe 12 to apply a back pressure to the engine 10 and increase loads to the engine 10. At this time, the controller 27 increases a fuel injection quantity F by the fuel injection device 14 of the engine 10 corresponding to the above-mentioned load. As a result, a temperature of the exhaust gas rises, thereby making it possible to burn and remove the particulate matter trapped in the filter 21.

The second embodiment executes the regeneration treatment by driving at least one of the intake throttle valve 42 and the exhaust throttle valve 43 in the direction of throttling the flow passage as describe above, and does not particularly differ in the basic function from the aforementioned first embodiment.

Particularly, in a case of the second embodiment, since the regeneration treatment is executed by driving at least one of the intake throttle valve 42 and the exhaust throttle valve 43 in the direction of throttling the flow passage, the regeneration treatment can be executed at a lower temperature as compared to a case of executing the regeneration treatment by the post injection. Thereby, durability of the filter 21 can be improved.

It should be noted that each of the aforementioned embodiments is explained by taking a case where the first estimated trapping amount H1 is estimated based upon an engine rotational number N, a fuel injection quantity F and an exhaust gas temperature T as an example. However, the present invention is not limited thereto, and, for example, the first estimated trapping amount H1 may be estimated based upon not only an engine rotational number N, a fuel injection quantity F and an exhaust gas temperature T, but also a temperature of each of components such as a filter, a state amount such as an engine load (state amount representative of an operating condition) and the like.

Each of the aforementioned embodiments is explained by taking a case where the exhaust gas purifying device 18 is configured by the oxidation catalyst 20 and the filter 21 as an example. However, the present invention is not limited thereto, and may be configured, for example, by combining a urea injection valve, a selective reduction catalyst device and the like in addition to the oxidation catalyst and the particulate matter removing filter.

Further, each of the aforementioned embodiments is explained by taking a case where the exhaust gas purifying device 18 is mounted on the compact hydraulic excavator 1 as an example. However, the construction machine provided with the exhaust gas purifying device by the present invention is not limited thereto, but may be applied to a middle-sized or larger-sized hydraulic excavator. In addition, the exhaust gas purifying device 18 may widely be applied also to a construction machine such as a hydraulic excavator which is provided with a wheel type lower traveling structure, a wheel loader, a fork lift, and a hydraulic crane, and the like.

DESCRIPTION OF REFERENCE NUMERALS

1: Hydraulic excavator (Construction machine)
2: Lower traveling structure (Vehicle body)
4: Upper revolving structure (Vehicle body)
10: Engine
18: Exhaust gas purifying device
21: Filter
22, 41: Regeneration device
26: Exhaust gas temperature sensor
27: Controller
H: Estimated trapping amount
Ht: Regeneration start threshold
He1: First regeneration terminated threshold
He2: Second regeneration terminated threshold
T: Exhaust gas temperature
Tt: Exhaust gas temperature threshold

The invention claimed is:

1. A construction machine comprising:
    a vehicle body;
    an engine that is mounted on said vehicle body and is driven by injection of fuel;
    an exhaust gas purifying device that is provided in an exhaust side of said engine and includes a filter for trapping particulate matter in an exhaust gas discharged from said engine; and
    a regeneration device that burns the particulate matter trapped in said filter in said exhaust gas purifying device to execute regeneration treatment of said filter, wherein:
    said regeneration device includes:
        a rotational sensor that detects a rotational number of said engine;
        a pressure sensor that detects a pressure of said filter;
        an exhaust gas temperature sensor that detects a temperature (T) of an exhaust gas discharged from said engine;
        a controller connected to said rotational sensor, said pressure sensor and said exhaust gas temperature sensor and configured by a microcomputer; and
        a fuel injection device connected to said controller that injects fuel for regeneration treatment based upon a control signal from said controller, wherein
    said controller of said regeneration device estimates a trapping amount of the particulate matter trapped in said filter based upon a signal that includes either of a rotational number signal of the engine detected by said rotational sensor or a pressure signal of said filter detected by said pressure sensors,
    said controller of said regeneration device starts the regeneration treatment of said filter by starting the fuel injection for the regeneration treatment from said fuel injection device when the estimated trapping amount (H) is equal to or more than a preset regeneration start value (Ht),
    said controller of said regeneration device interrupts the regeneration treatment of said filter by interrupting the fuel injection for the regeneration treatment from said fuel injection device when the exhaust gas temperature (T) detected by said exhaust gas temperature sensor becomes less than a preset given temperature (Tt) in the middle of executing the regeneration treatment of said filter,
    said controller of said regeneration device restarts the regeneration treatment of said filter by restarting the fuel injection for the regeneration treatment from said fuel injection device when the exhaust gas temperature (T) becomes equal to or more than the preset given temperature (Tt) in a case where the regeneration treatment of said filter is interrupted,
    said controller of said regeneration device terminates the regeneration treatment of said filter by terminating the fuel injection for the regeneration treatment from said fuel injection device when the estimated trapping amount (H) is equal to or less than a normal terminated value (He1) in a case where the regeneration treatment of said filter normally terminates without the interruption, and
    on the other hand, said controller of said regeneration device terminates the regeneration treatment of said filter by terminating the fuel injection for the regeneration treatment from said fuel injection device when the estimated trapping amount (H) is equal to or less than a restart terminated value (He2) in a case of terminating the regeneration treatment restarted, and
    the restart terminated value (He2) is set between the regeneration start value (Ht) and the normal terminated value (He1).

* * * * *